United States Patent
Miyazawa

(10) Patent No.: US 9,549,116 B2
(45) Date of Patent: Jan. 17, 2017

(54) FOCUS ADJUSTMENT DEVICE AND CONTROL METHOD FOR FOCUS ADJUSTMENT DEVICE

(71) Applicant: Olympus Corporation, Hachioji-shi, Tokyo (JP)

(72) Inventor: Shingo Miyazawa, Hino (JP)

(73) Assignee: Olympus Corporation, Tokyo (JP)

( * ) Notice: Subject to any disclaimer, the term of this patent is extended or adjusted under 35 U.S.C. 154(b) by 79 days.

(21) Appl. No.: 14/608,725

(22) Filed: Jan. 29, 2015

(65) Prior Publication Data

US 2015/0229831 A1    Aug. 13, 2015

(30) Foreign Application Priority Data

Feb. 10, 2014    (JP) ................................. 2014-023159

(51) Int. Cl.
*H04N 5/232* (2006.01)
*G03B 13/36* (2006.01)
*G02B 7/36* (2006.01)

(52) U.S. Cl.
CPC .......... *H04N 5/23212* (2013.01); *G03B 13/36* (2013.01); *H04N 5/23209* (2013.01); *G02B 7/36* (2013.01)

(58) Field of Classification Search
CPC   H04N 5/23212; H04N 5/23209; G03B 13/36; G02B 7/36
USPC ............................... 348/208.12, 345, E5.045
See application file for complete search history.

(56) References Cited

U.S. PATENT DOCUMENTS

| 9,247,122 | B2* | 1/2016 | Ichimiya | G02B 7/346 |
| 2008/0025714 | A1* | 1/2008 | Ishii | G03B 13/36 396/104 |
| 2009/0148146 | A1* | 6/2009 | Maeda | G02B 7/38 396/89 |
| 2014/0267821 | A1* | 9/2014 | Masuura | H04N 7/18 348/222.1 |
| 2015/0207982 | A1* | 7/2015 | Umezawa | H04N 5/23212 348/353 |

FOREIGN PATENT DOCUMENTS

JP    2007-178480    7/2007

* cited by examiner

*Primary Examiner* — Hung Lam
(74) *Attorney, Agent, or Firm* — John C. Pokotylo; Straub & Pokotylo

(57) ABSTRACT

A focus adjustment device has an image sensor for forming a subject image using light flux that has been received through a photographing lens, and generating image signals, and executes focus adjustment based on the image signals. This focus adjustment device comprises a focus detection region setting section for setting a plurality of focus detection regions of differing sizes, within a region in which an image is formed by the image sensor, a determination section, for detecting contrast of image signals within focus detection regions respectively relating to the plurality of focus detection regions, and determining change of a subject based on amount of change of the contrast and temporal change in amount of change of the contrast, and a control section for, in a case where the determination section has determined that there is subject change when a focus adjustment operation is stopped, starting the focus adjustment operation.

12 Claims, 11 Drawing Sheets

FIG. 8

| EREA | SMALL AREA | | | | LARGE AREA | | | |
| --- | --- | --- | --- | --- | --- | --- | --- | --- |
| HPF | HPF1 | | HPF2 | | HPF1 | | HPF2 | |
| THRESHOLD VALUE | SMALL 1-1 | SMALL 1-2 | SMALL 2-1 | SMALL 2-2 | LARGE 1-1 | LARGE 1-2 | LARGE 2-1 | LARGE 2-2 |
| CHANGE DETECTION CASE | A | B | A | B | A | A | A | A |
| UNDETECTED CASE | | C | | | | C | | |

A: CHANGE DETECTED
B: DEFINED CHANGE DETECTED
C: CHANGE UNDETECTED

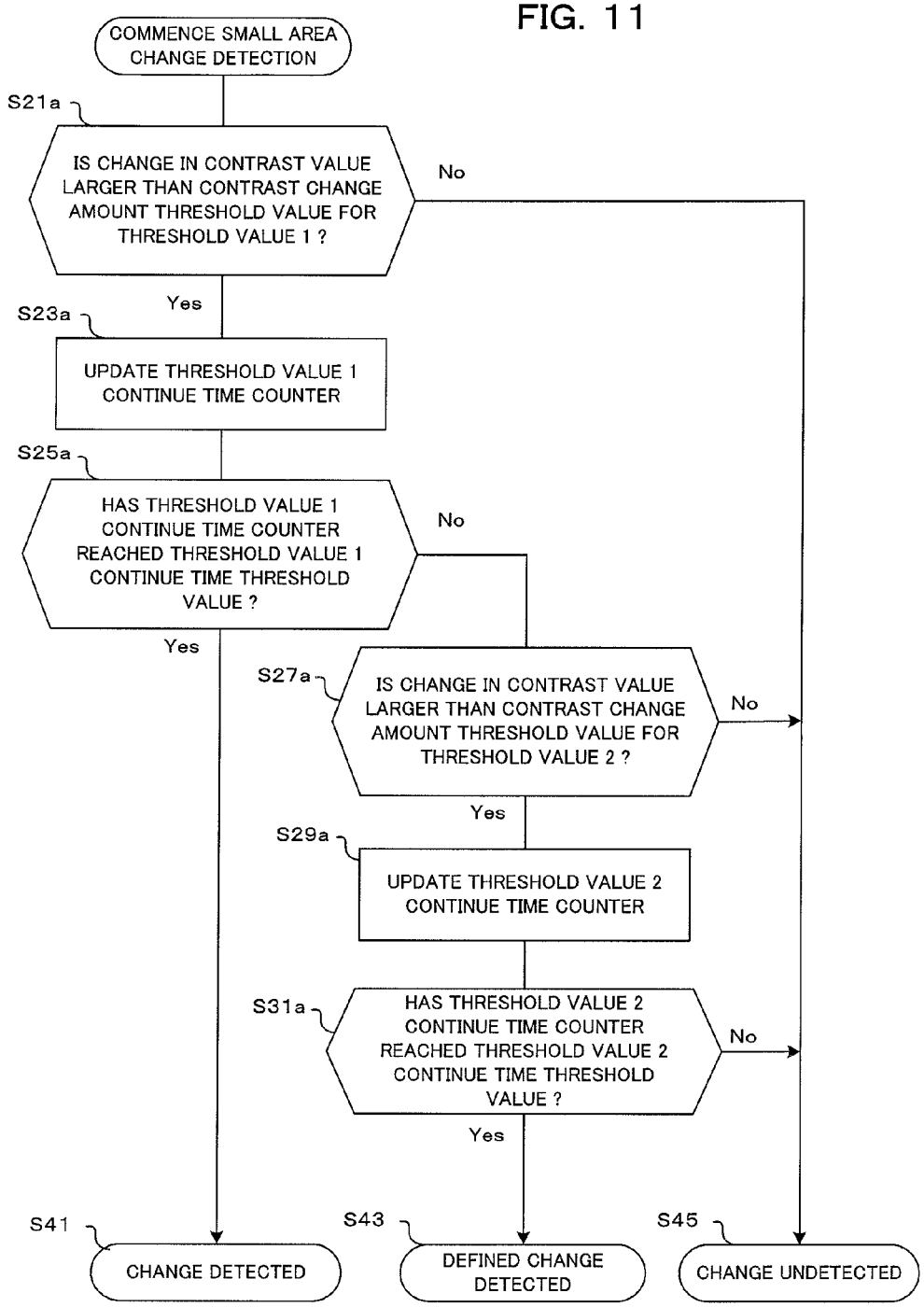

FOCUS ADJUSTMENT DEVICE AND CONTROL METHOD FOR FOCUS ADJUSTMENT DEVICE

Benefit is claimed, under 35 U.S.C. §119, to the filing date of prior Japanese Patent Application No. 2014-023159 filed on Feb. 10, 2014. This application is expressly incorporated herein by reference. The scope of the present invention is not limited to any requirements of the specific embodiments described in the application.

BACKGROUND OF THE INVENTION

1. Field of the Invention

The present invention relates to a focus adjustment device, having an image sensor for generating image signals by forming an image from light flux received through a photographing lens, for carrying out focus adjustment based on the generated image signals, and a control method for a focus adjustment device.

2. Description of the Related Art

It is well known to generate an image signal by photoelectrically converting a subject image based on light flux that has passed through a photographing lens, and carrying out focus adjustment for the photographing lens based on a contrast state of the generated image signal. Detection of a contrast state is generally carried out based on image signals of an AF area that has been set within a shooting screen. In this case, the background of a subject is included within the set AF area, and in a state where the subject and the background image are mixed, AF precision is lowered.

There has therefore been proposed a focus detection device that prevents a background mixing within an AF area and improves AF precision, by carrying out a focus adjustment operation using a smaller AF area included within a normal AF area (refer to Japanese patent laid-open No. 2007-178480).

SUMMARY OF THE INVENTION

An object of the present invention is to provide a focus adjustment device that is capable of improving focus adjustment precision and stability of a focus adjustment operation, and a control method for a focus adjustment device.

A focus adjustment device of the present invention has an image sensor for forming a subject image using light flux that has been received through a photographing lens, and generating image signals, and executes focus adjustment based on the image signals. This image sensor comprises a focus detection region setting section for setting a plurality of focus detection regions of differing sizes, within a region in which an image is formed by the image sensor, a determination section, for detecting contrast of image signals within focus detection regions respectively relating to the plurality of focus detection regions, and determining change of a subject based on amount of change of the contrast and temporal change in amount of change of the contrast, and a control section for, in a case where the determination section has determined that there is subject change when a focus adjustment operation is stopped, starting the focus adjustment operation.

A control method for a focus adjustment device of the present invention, that has an image sensor for forming a subject image using light flux that has been received through a photographing lens, and generating image signals, and executes focus adjustment based on the image signals, is provided. This control method for a focus adjustment device comprises setting a plurality of focus detection regions of differing sizes within a region in which an image is formed by the image sensor, detecting contrast of image signals within focus detection regions respectively relating to the plurality of focus detection regions, determining change of a subject based on amount of change of the contrast and temporal change in amount of change of the contrast, and in a case where change of a subject has been determined when a focus adjustment operation is stopped, starting the focus adjustment operation.

BRIEF DESCRIPTION OF THE DRAWINGS

FIG. 8 is a table showing conditions in the case where change detection has been carried out using two AF areas, namely a large area and a small area, with the camera of one embodiment of the present invention.

FIG. 11 is a flowchart showing operation for small area change detection of the camera of one embodiment of the present invention.

DETAILED DESCRIPTION OF THE PREFERRED EMBODIMENTS

An example where a digital camera is adopted as one embodiment of the present invention will be described in the following. This camera has an image sensor for forming a subject image using light flux that has been received through a photographing lens, and generating image signals, and executes focus adjustment based on the image signals. Specifically, this camera has an imaging section, for converting a subject image that has been formed by a photographing lens to image data, and the subject image is subjected to live view display on a display section arranged on the rear surface of the camera body based on this converted image data. The photographer then determines composition and timing of a still picture or movie by observing the live view display. If playback mode is selected, the still picture or movie can be playback displayed on a display section.

Also, the camera of this embodiment acquires contrast values from image signals that have been acquired from the imaging section, and carries out focus adjustment of the photographing lens such that this contrast value becomes a peak. With focus adjustment, after the focus lens has reached a focus position it is determined whether or not to recommence a focus adjustment operation based on change amount of contrast value and temporal change amount, based on image signals of an AF area.

Figure 1:
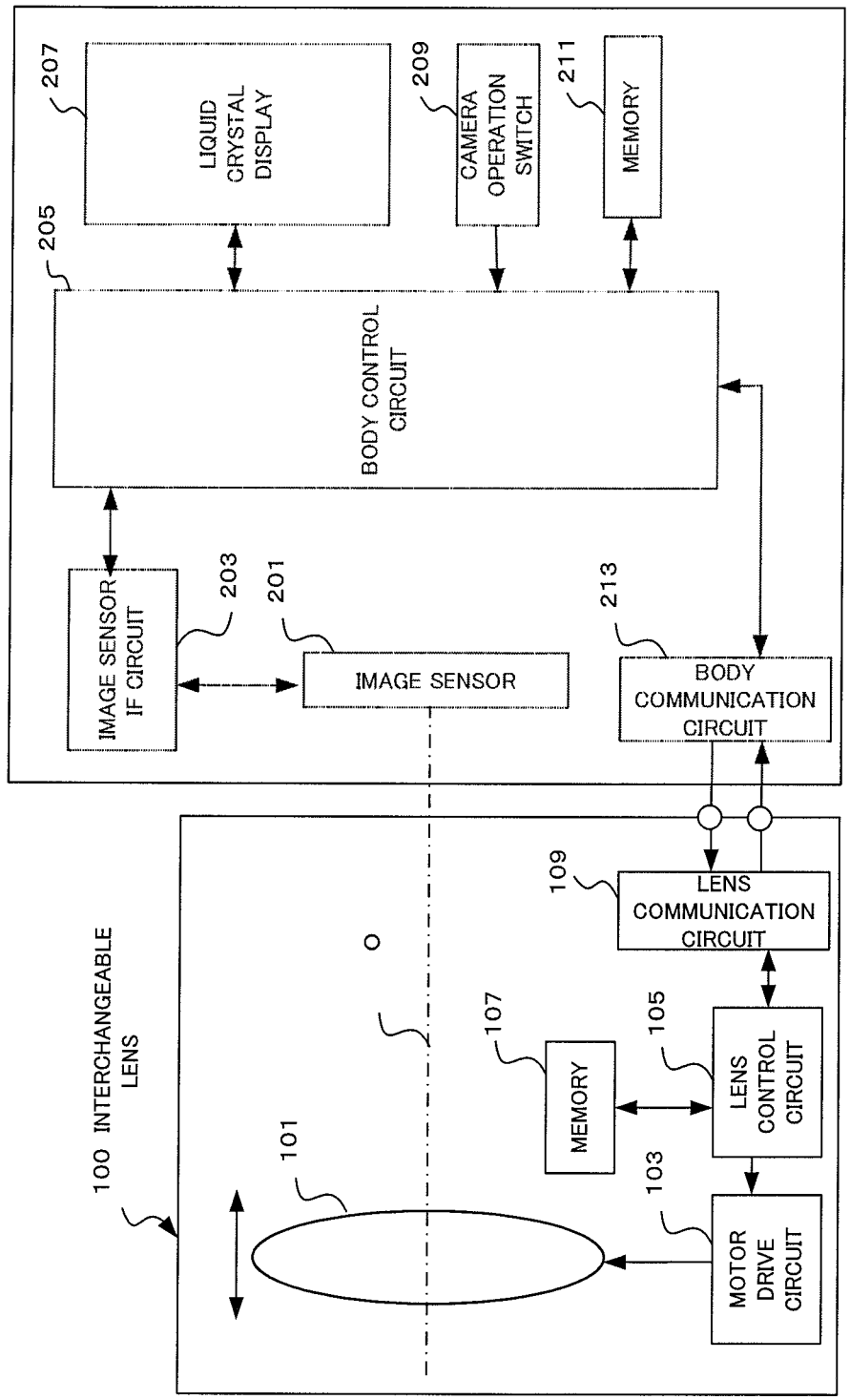
FIG. 1 is a block diagram mainly showing the electrical structure of a camera of one embodiment of the present invention.

FIG. 1 is a block diagram mainly showing the electrical structure of a camera of one embodiment of the present invention. The camera relating to this embodiment comprises an interchangeable lens 100 and a camera body 200. With this embodiment, an interchangeable lens type camera is described, but this is not limiting and it is also possible have a camera where the lens barrel and the camera body are integrated.

A photographing lens 101, motor drive circuit 103, lens control circuit 105, memory 107, and lens communication circuit 109 are provided within the interchangeable lens 100.

The photographing lens 101 is constituted by a plurality of optical lenses, including a focus lens, for forming a subject image, and is a fixed focal length lens or a zoom lens. The focus lens of the photographing lens 101 is driven in the optical axis direction of the photographing lens 101 by the motor drive circuit 103. The motor drive circuit 103 carries out drive control in accordance with control signals from the lens control circuit 105.

The memory 107 is an electrically rewritable nonvolatile memory, and stores various data of the interchangeable lens 100, for example, focal length information, aperture information, optical characteristics of the photographing lens 101, and various adjustment values etc. The memory 107 also stores programs for control of the lens control circuit 105.

The lens control circuit 105 includes a CPU (Central Processing Unit), and further includes peripheral circuits comprising an ASIC (Application Specific Integrated Circuit) and DSP (Digital Signal Processor) etc., and carries out communication with a body control circuit 205 within the camera body 200, and carries out control within the interchangeable lens 100, in accordance with the programs stored in the memory 107. The lens communication circuit 109 carries out communication with the body control circuit 205 via a body communication circuit 213 within the camera body 200.

An image sensor 201, image sensor IF circuit 203, body control circuit 205, liquid crystal display 207, camera operation switch 209, memory 211 and body communication circuit 213 are provided within the camera body 200.

On the optical axis of this photographing lens 101, the image sensor 201 is arranged at a position where the subject image is formed. The image sensor 201 converts an optical image that has been formed by the photographing lens 101 to image signals. Specifically, the image sensor 201 has photodiodes that constitute each pixel arranged two-dimensionally in a matrix shape, each photodiode generates photoelectric conversion current in accordance with received light amount, and this photoelectric conversion current is the subject of charge storage by a capacitor connected to each photodiode.

The image sensor IF circuit 203 carries out charge storage control and image signal readout of the image sensor 201. The image sensor IF circuit 203 repeatedly reads out stored charge from the capacitors of the image sensor 201 as image signals. The readout image signals (also referred to as image data) are output to the body control circuit 205.

The body control circuit 205 includes a CPU (Central Processing Unit), and further includes peripheral circuits comprising an ASIC (Application Specific Integrated Circuit) and DSP (Digital Signal Processor) etc., and carries out overall control of the camera body 200 and the interchangeable lens 100, in accordance with programs stored in the memory 211. Also, the body control circuit 205 is input with image signals from the image sensor IF circuit 203, obtains a contrast value, and carries out a focus adjustment operation for the photographing lens 101 by means of the lens control circuit 105 so that this contrast value becomes a peak. Details of this focus adjustment operation will be described later using FIG. 2 to FIG. 9. The body control circuit 205 also generates image data for live view display based on the image signals, and generates image data for storage, and reads out image data that have been stored in a storage medium to generate image data for playback display.

Figure 3:
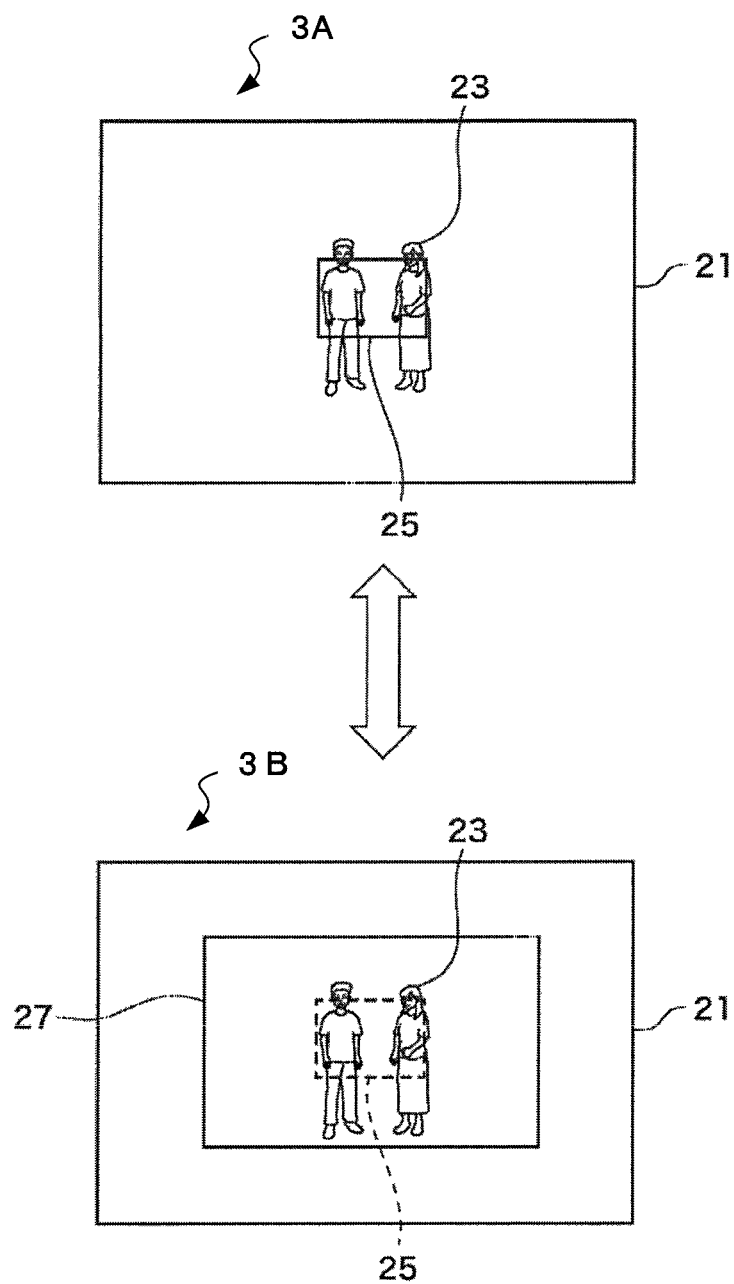
FIG. 3 is a drawing showing AF area setting in accordance with movie AF state, with the camera of one embodiment of the present invention.

The body control circuit 205 also functions as a focus detection region setting section for setting a plurality of focus detection regions of differing sizes, within a region where an image is formed by the image sensor 201. The focus detection regions may be, for example, a small area 25 and a large area 27, as shown in FIG. 3, which will be described later.

The body control circuit 205 also functions as a determination section, for detecting contrast of image signals within focus detection regions respectively relating to the plurality of focus detection regions, and determining change of a subject based on amount of change of the contrast and temporal change in amount of change of the contrast. As will be described later using FIG. 2, with this embodiment if a focused state is temporarily achieved, a focus adjustment operation is stopped and it is determined by the determination section whether or not there is significant change in a subject image and it is necessary to recommence the focus adjustment operation (for example, refer to change detection 15 in FIG. 2 and FIG. 9 to FIG. 11). Change amount of contrast is amount that contrast of a subject has change from commencement of contrast detection, and in FIG. 5 and FIG. 7, for example, which will be described later, in the event that a small area contrast value 31 dips below contrast thresholds C-Th1, C-Th2 it is determined that there is a large possibility of change in a subject image. Also, as a state where there is temporal change in change amount of contrast, in FIG. 5 and FIG. 7, for example, when contrast value has fallen below the threshold, in a case where the time for which a state where the contrast value is smaller than the threshold continues is longer than an threshold equivalent to a specified time, it is determined that there is a large possibility of change in the subject image.

Figure 9:
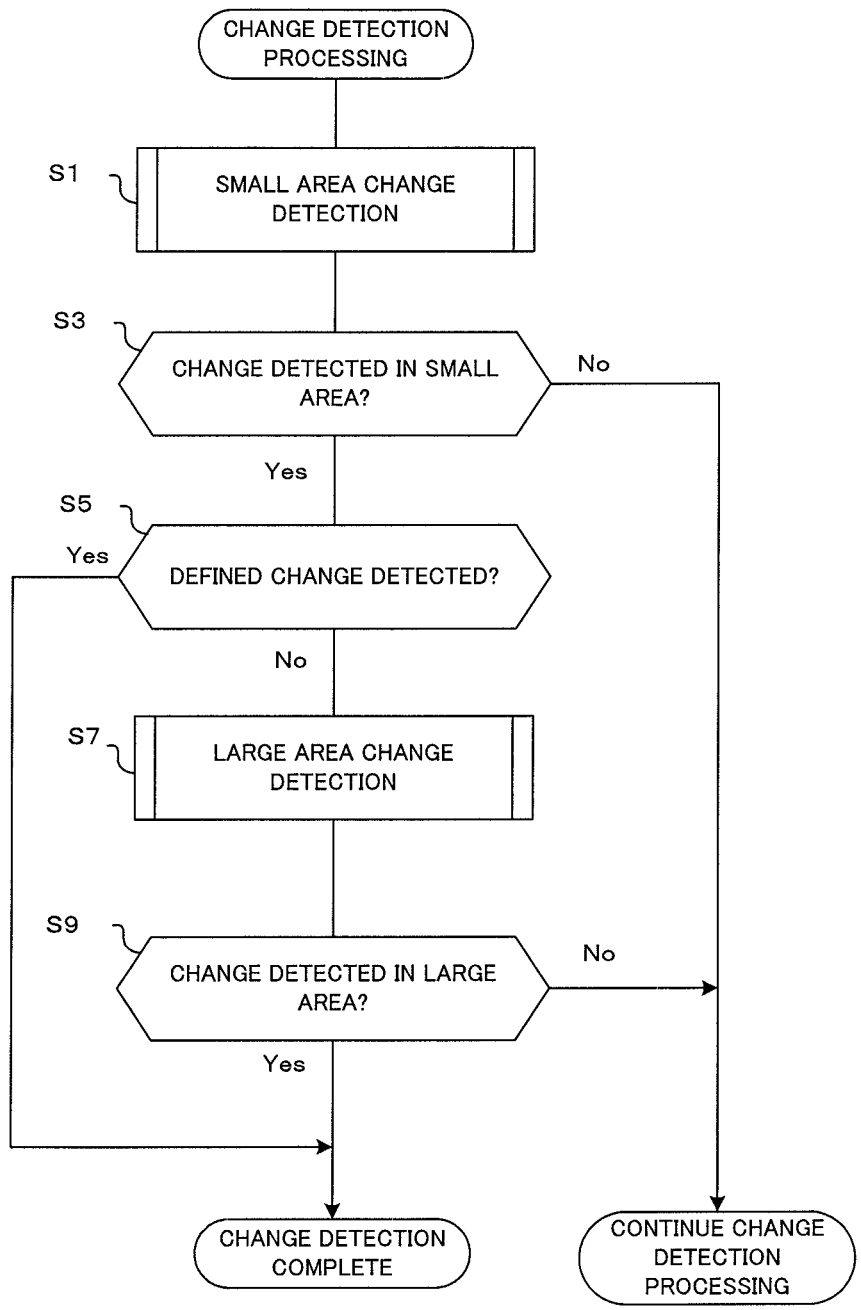
FIG. 9 is a flowchart showing operation for change detection of the camera of one embodiment of the present invention.

The determination section mentioned above measures a first time where the contrast change amount is in a state having exceeded a first determination value (for example, in FIG. 5 and FIG. 7, where contrast value becomes smaller than contrast thresholds C-Th1, C-Th2), and when the first time exceeds a second determination value (for example, in FIG. 5 and FIG. 7, threshold times T-Th1, T-Th2) determines that there is change in the subject image (refer to S1, S3 and S5 in FIG. 9, and S27a, S29a, S31a and S43 in FIG. 11).

The above mentioned determination section also specifically determines a first determination value and second determination value, that are different, for the plurality of focus detection regions that differ in size. For example, two threshold values are provided, namely contrast threshold C-Th1 (threshold time T-Th1 corresponding to this) and contrast threshold C-Th2 (threshold time T-Th2 corresponding to this) (refer also to the third row of FIG. 8).

Figure 10:
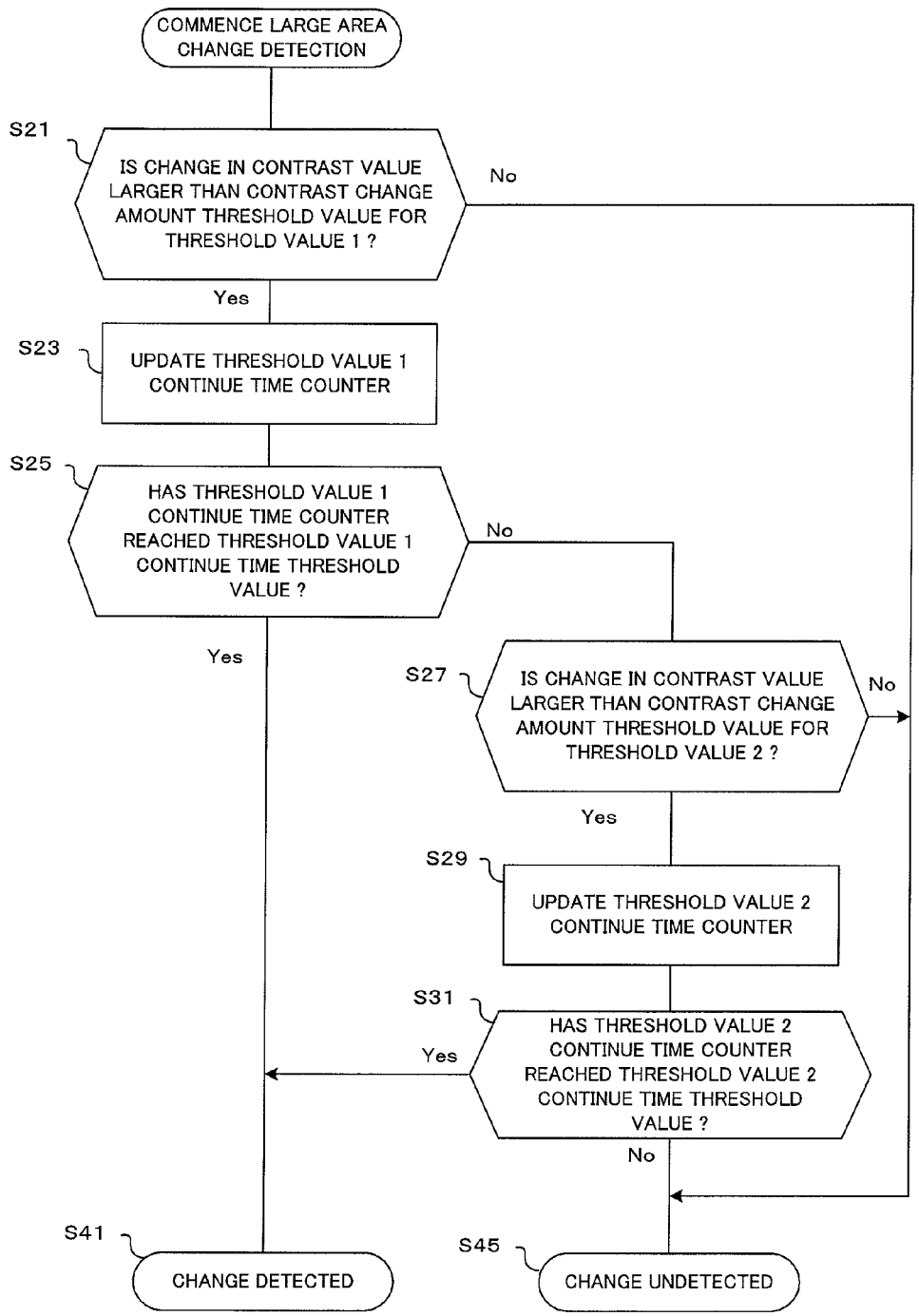
FIG. 10 is a flowchart showing operation for large area change detection of the camera of one embodiment of the present invention.

The above mentioned determination section also specifically measures a second time for a state in which a change amount for contrast, in a smaller focus detection region, among the plurality of focus detection regions of differing sizes, exceeds a third determination value that is smaller than the first determination value, and if the second time exceeds a fourth determination value that is smaller than the second determination value, measures a third time for a state in which change amount for contrast in a larger focus detection region exceeds the third determination value, the third time exceeds the fourth determination value, determines that there is change of the subject image (refer to S3, S5, S7 and S9 in FIG. 9, S21, S23, S25 Y and S41 in FIG. 10, and S21a, S23a, S25a and S41 in FIG. 11, the third determination value in this case corresponding to C-th1, and the fourth determination value corresponding to T-th1).

The above mentioned determination section also specifically measures a second time fora state in which a change amount for contrast, in a smaller focus detection region, among the plurality of focus detection regions of differing sizes, exceeds a third determination value that is smaller than the first determination value, and if the second time exceeds a fourth determination value, measures a third time for a state in which change amount for contrast in a larger focus detection region exceeds the third determination value, and in the event that the third time does not exceed the fourth determination value that is smaller than the second determination value, determines that there is no change of the subject image (for example, refer to S3, S5, S7 and SN in FIG. 9, S21, S23, S25 N and S45 in FIG. 10, and S21a, S23a, S25a and S41 in FIG. 11).

The body control circuit 205 also functions as a control section for, in a case where the determination section has determined that there is subject change when a focus adjustment operation is stopped, starting the focus adjustment operation. As will be described later using FIG. 9, with this embodiment determination as to whether or not change has been detected is based on change in contrast, and in the event that change has been detected (for example, refer to the change detection phase 15 of FIG. 2 and change detection complete in S11 of FIG. 9), a focus adjustment operation is restarted.

The above mentioned control section also carries out a focus adjustment operation by switching between a first operating state where a focus adjustment operation is carried out (for example, search phase 11 and Wob phase 13 in FIG. 2, that will be described later) and a second operating state where focus detection operation is stopped and change of a subject image is detected (for example, the change detection phase 15 in FIG. 2 that will be described later). The above mentioned focus detection region setting section makes arrangement of focus detection regions different for the first operating state and the second operating state (for example, in FIG. 3, which will be described later, switching is carried out between the small area 25 and the large area 27).

A liquid crystal display 27 is connected to the body control circuit 205, and has a rear liquid crystal panel. The liquid crystal display 27 is input with image data for live view display and image data for playback display etc., from the body control circuit 205, and carries out live view image display and playback display etc. The panel for display is not limited to a liquid crystal panel, and may also be, for example, organic EL etc.

The camera operation switch 209 includes various operation members provided on the camera, and detects operating states of the various operation members to output detection signals to the body control circuit 205. As the various operation members there are a power supply button, a release button, a movie button, a menu button, a cross-key button, an OK button, and a playback button etc. If the movie button is operated, movie shooting is commenced, and if the movie button is operated again movie shooting is terminated. If movie shooting mode is set using a mode dial or menu screen etc., it is also possible to start and terminate movie shooting using operation of the release button.

The body communication circuit 213 is connected to the lens communication circuit 109 and carries out communication between the body control circuit 205 and the lens control circuit 105.

Next, a focus adjustment operation of this embodiment will be described using the flowcharts shown in FIG. 2-FIG. 11. FIG. 2 shows a focus adjustment operation at the time of movie shooting. If movie shooting is commenced, a wobbling (referred to as Wob) phase 13 is entered. In this Wob phase 13, the body control circuit 205 alternately drives the photographing lens 101 by microscopic amounts in the close up direction and the infinity direction using the lens control circuit 105 and the motor drive circuit 103, calculates a contrast value based on image signals from the image sensor 201 during drive, and determines a direction for focus position and whether there is currently a focused state.

In the Wob phase 13 direction for focus position is detected, and if it is determined that focus position is at a far position there is a transition from the Wob phase 13 to a search phase 11. In this search phase 11, the body control circuit 205 drives the photographing lens 101 towards the infinity end or the close-up end using the lens control circuit 105 and the motor drive circuit 103, calculates a contrast value based on image signals from the image sensor 201 during drive, and searches for a peak position of this contrast value.

In the search phase 11, if the vicinity of a peak position for contrast value is reached, there is a transition from the search phase 11 back to the Wob phase 13 again. In the Wob phase 13 that has been transitioned to once again, the body control circuit 205 detects peak position while alternately driving the photographing lens 101 by microscopic amounts in the close up direction or the infinity direction, using the lens control circuit 105 and the motor drive circuit 103.

In the Wob phase 13, if a peak position for contrast value (focus position of the photographing lens 101) is detected, there is a transition to a change detection phase 15. In this change detection phase 15, the body control circuit 205 stops the photographing lens 101 at the peak position that was detected in the Wob phase 13 using the lens control circuit 105 and the motor drive circuit 103, and carries out change detection to determine whether lens drive is to be started again every time image signals for one frame are input from the image sensor 201. Specifically, in movie shooting, if focus adjustment of the photographing lens 101 is carried out at short intervals, the focus position of the subject image will move at short intervals, resulting in an unnatural and uncomfortable feeling for the photographer. Therefore, if the photographing lens 101 reaches a focused position lens drive is temporarily stopped, and lens drive is restarted if change of the subject is larger than a specified value.

Next, change of AF area will be described using FIG. 3. State 3A shown in FIG. 3 shows AF area for the search phase 11 and the Wob phase 13. Specifically, in the search phase 11 and the Wob phase 13, the small area 25 is set as the AF area in order to achieve focus for the subject 23 within the shooting range 21. If the small area 25 is set, the body control circuit 205 calculates contrast value for image signals of a region corresponding to the small area 25, among the image signals from the image sensor 201, and carries out control of the photographing lens 101 so that this contrast value becomes a peak. If the small area 25 is set as the AF area, only the intended subject is captured within the AF area, and it is possible to carry out high precision focus detection.

If there has been a transition from the search phase 11 to the Wob phase 13, and the photographing lens 101 has stopped at a focused position in the Wob phase 13, then, as described previously, there is a transition to the change detection phase 15. Once there has been a transition to the change detection phase 15, then the large area 27 is set as the AF area, as shown by state 3B in FIG. 3. If the large area 27 is set, the body control circuit 205 calculates contrast value for image signals of a region corresponding to the large area 27, among the image signals from the image sensor 201, and monitors for change in contrast value.

In the change detection phase 15, if the AF area was to be kept as the small area 25, the subject would often fall outside of the small area 25, due to shake of the camera or subject movement etc. In this case, contrast value within the AF area would not be stable and change would be detected at frequent intervals, resulting in frequent restarting of lens drive and degradation in visual quality of display of a stored movie or during movie recording. The AF area is therefore changed to the large area 27 if there is a transition to the change detection phase 15.

Next, setting of a plurality of AF areas for the change detection phase 15 will be described using FIG. 4 to FIG. 7. In FIG. 3, in the change detection phase 15 the large area 27 was set as the AF area, but it is also possible to set the small area 25 in addition to the large area 27 and monitor for change in subject image using contrast values for both areas.

Figure 4:
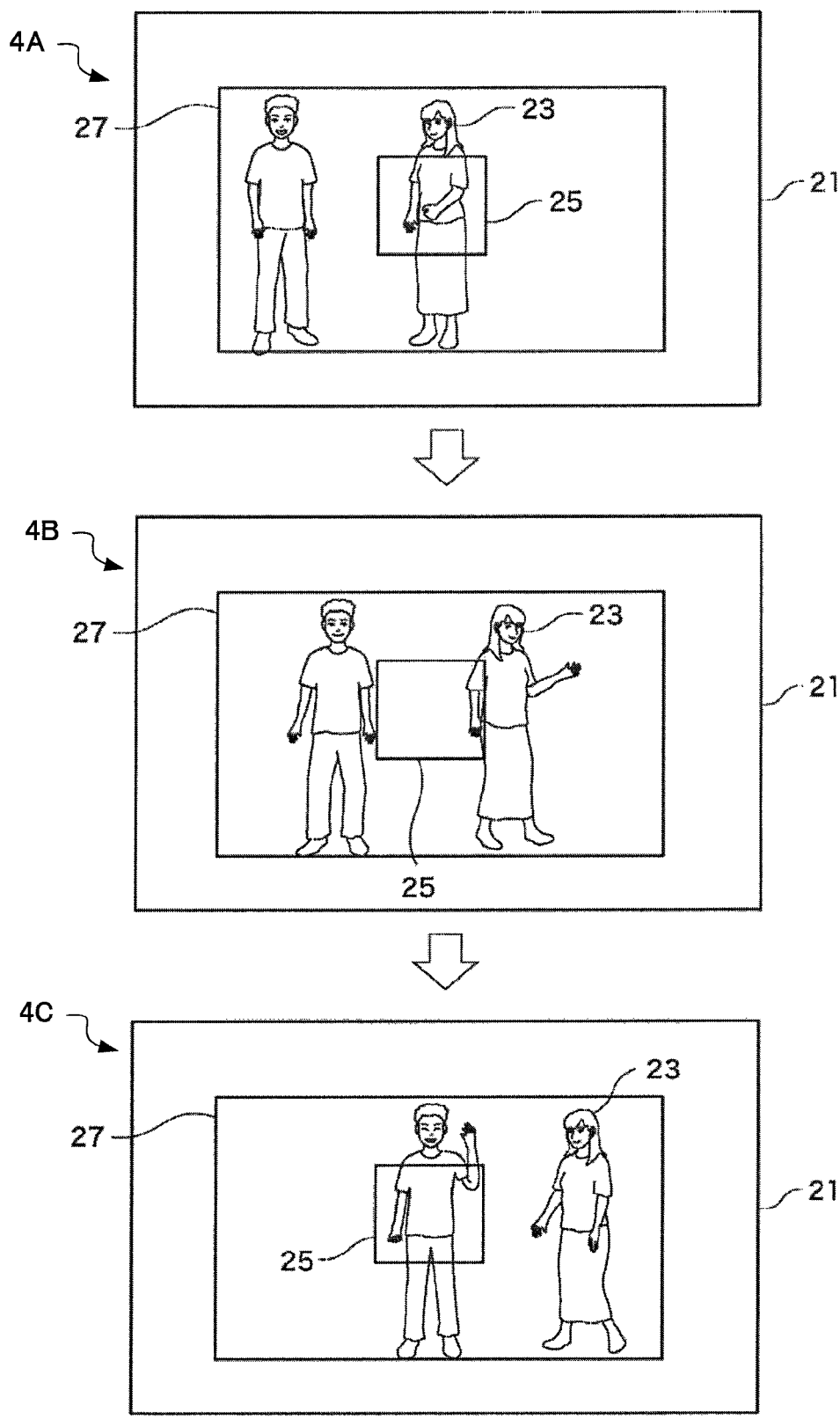
FIG. 4 is a drawing showing change detection for a subject that is moving around, using a plurality of AF areas
Figure 5:
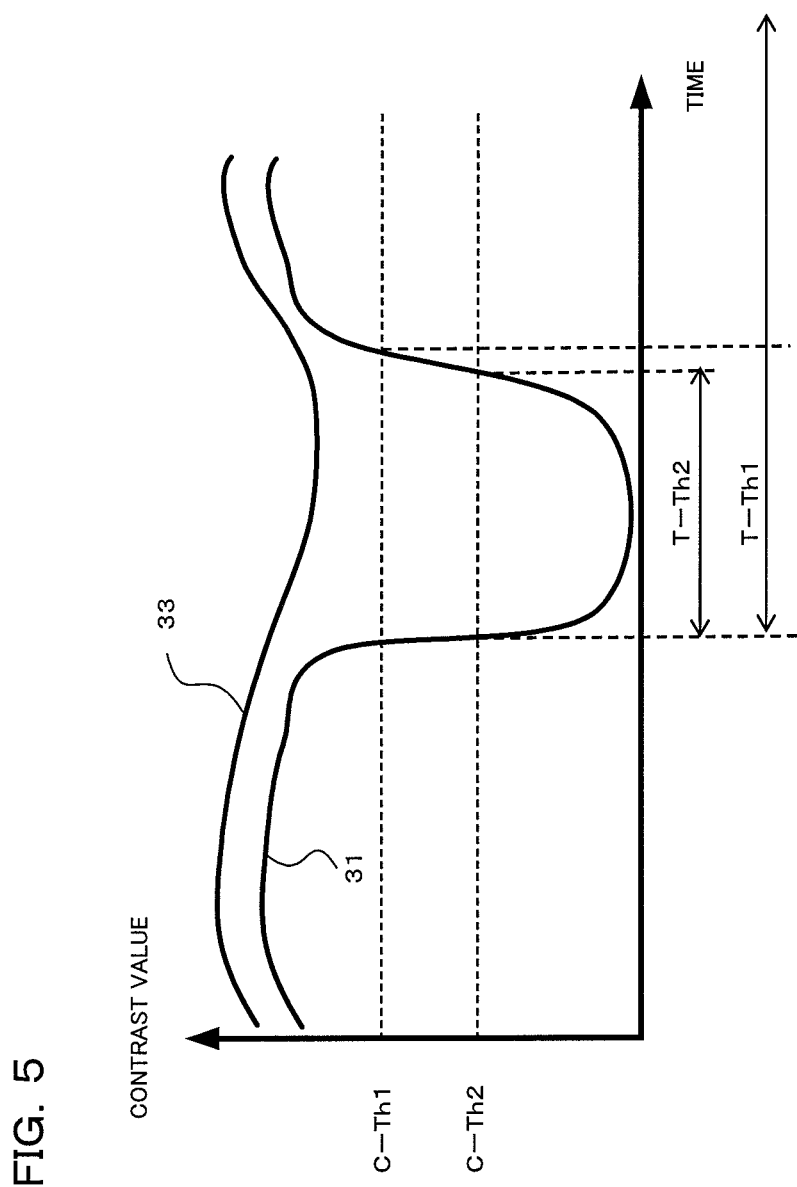
FIG. 5 is a graph showing change in contrast value in the case where a plurality of AF areas are used, with the camera of one embodiment of the present invention.

A case where a moving subject is shot, as shown in FIG. 4, will be assumed. With this example, within the shooting range 21 two areas, namely the small area 25 and the large area 27, are set as AF areas for a subject 23 that is moving in the left and right direction.

In state 4A in FIG. 4, inside the small area 25 constitutes a torso portion of a person on the right. If state 4B is entered, there are only the hand of the person on the right within the small area 25, and compared to state 4A contrast value has change significantly. Then, if state 4C is entered the torso of the person on the left is within the small area 25 and contrast value changes considerably again. In this way, contrast value within the small area 25 varies significantly, as shown by the small area contrast value 31 of FIG. 5. For a moving subject, if change in contrast value if the small area is monitored, then since the area is small the subject moves in and out of the area, and contrast value is not stable.

On the other hand, for any of states 4A, 4B or 4C substantially the entire subject 23 is contained within the large area 27. The contrast value within the large area 27 is therefore comparatively stable, as shown by the large area contrast value 33 in FIG. 5. Specifically, in the case where contrast value is monitored in the large area, it is easy for movement of the subject 23 to fit in the area and contrast value is made stable. Accordingly, in a case where the subject 23 moves left and right at positions equidistant from the camera, if the large area 27 is set and contrast value is monitored on the basis of image signals for this area, it is possible to prevent unnecessary change detection and restarting of lens drive.

Figure 6:
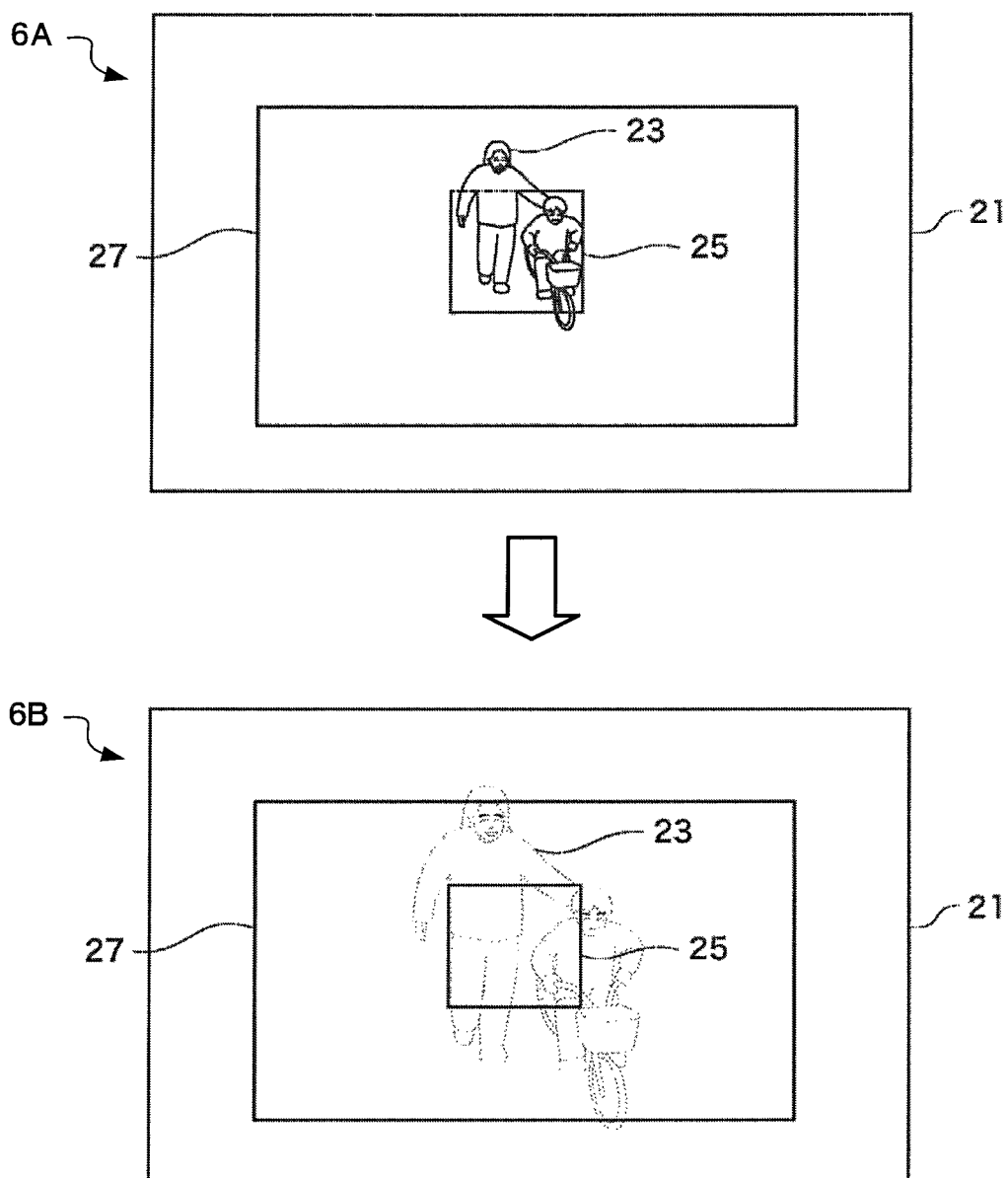
FIG. 6 is a drawing for describing negative effects in the case of carrying out change detection using a plurality of AF areas, with the camera of one embodiment of the present invention.
Figure 7:
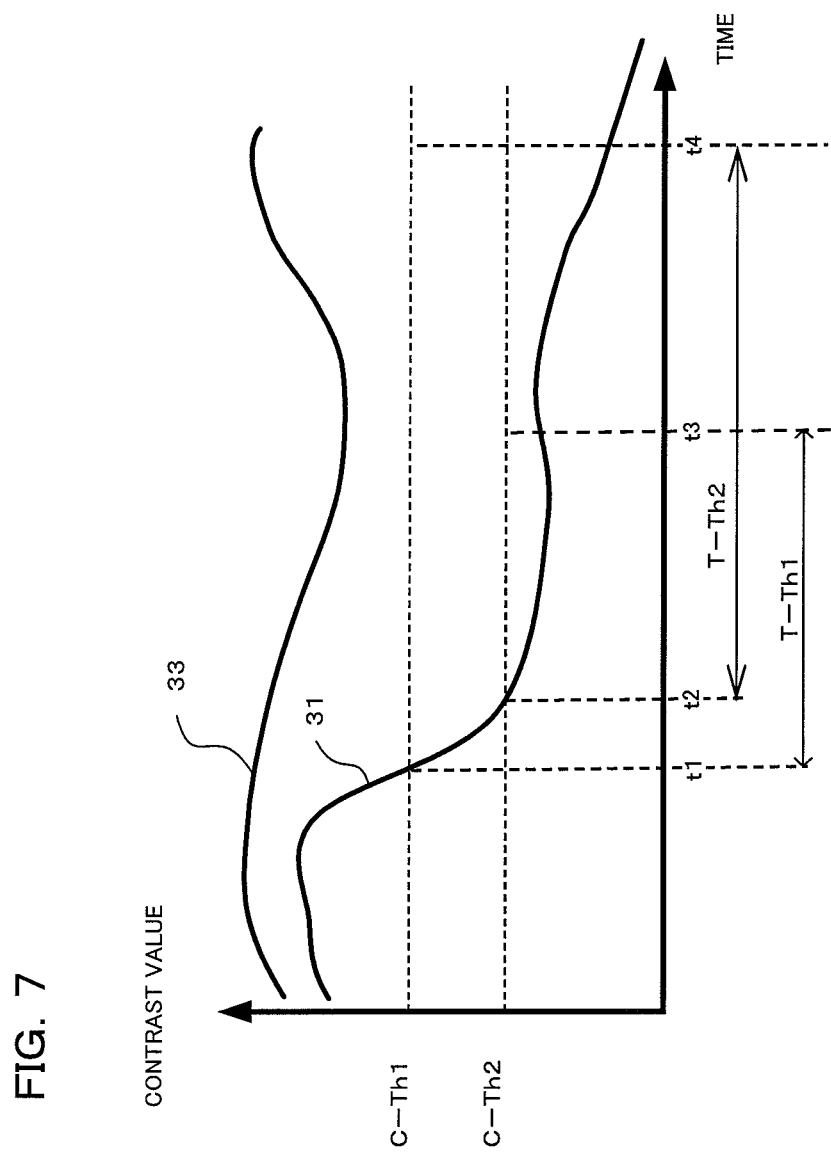
FIG. 7 is a drawing for describing defined change detection, with the camera of one embodiment of the present invention.

Next, a subject that is moving in a depth direction, as shown in FIG. 6, is assumed. With this example, within the shooting range 21 two areas, namely the small area 25 and the large area 27, are set as AF areas for a subject 23 that is moving so as to approach the camera. State 6A in FIG. 6 is a focused state of the photographing lens 101 with the subject 23 far away. State 6B in FIG. 6 is a state where the subject 23 has moved closer from the case of state 6A, and the photographing lens 101 is away from the focused position FIG. 7 shows change in contrast value for a case of a subject that moves in a depth direction, as shown in FIG. 6. As shown in FIG. 7, in this case the large area contrast value 33 is comparatively stable and does not change. That is, change in the large area contrast value is small, and it is not possible to detect subject change for which lens drive should be restarted.

Therefore, with this embodiment, in the change detection phase 15 two areas are set as AF areas, namely the small area 25 in addition to the large area 27, and change detection is carried out based on contrast values for both areas.

In FIG. 7, contrast threshold C-Th1 and contrast threshold C-Th2 are threshold values for the small area contrast value 31, and C-Th1>C-Th2. Also, time threshold T-Th1 for contrast threshold C-Th1 is a threshold time for determining time from when the small area contrast value becomes smaller than contrast threshold C-Th1, until it becomes larger than contrast threshold C-Th1. Also, time threshold T-Th2 corresponding to contrast threshold C-Th2 is a threshold time for determining time from when the contrast value has become smaller than contrast threshold C-Th2 until it becomes larger than contrast threshold C-Th2.

In FIG. 7, for T-Th1 and T-Th2 an example has been described where contrast value becomes small and then becomes large again, but this is not limiting, and it is also possible to apply to a case where the contrast value becomes large and then becomes small again. In this case, a contrast threshold that has comparatively larger contrast value and a time threshold corresponding to this contrast threshold are provided, and determination may be carried out in the same way as for when contrast value changes significantly. In the following description, in order to avoid complication, only a case where contrast value changes in a direction of becoming smaller will be described.

With the example shown in FIG. 6 and FIG. 7, the large area contrast value 33 does not vary significantly, but looking at only the small area contrast value 31, at time t1 the small area contrast value becomes smaller than contrast threshold C-Th1, and t2 becomes smaller than contrast threshold C-Th2. Then, at time t3 contrast value becomes smaller than contrast threshold C-Th1 even though time threshold T-Th1 has elapsed, and at time t4 the small area contrast value becomes smaller than contrast threshold C-Th2 even though time threshold T-Th2 has elapsed.

With this embodiment, even in a case where there is no change in the contrast value of the large area 27, in the event that the contrast value of the small area 25 continues to change even though the time threshold T-Th1 and time threshold T-Th2 have elapsed, change detection is completed, that is, change has been detected, and so there is a transition from the change detection phase 15 to the Wob phase 13.

In the example shown in FIG. 7, although time threshold T-Th1 corresponding to contrast threshold C-Th1 has elapsed at the time t3, since the contrast value of the large area 27 does not change, at time t3 change detection is not completed. Also, at time t4, although there is no change in the contrast value for the large area 27, since the contrast value of the small area 25 exceeds the time threshold T-Th2 corresponding to contrast threshold C-Th2, change detection is completed.

Next, determination of change detection completion using two AF areas, small area 25 and large area 27, will be described using FIG. 8. In FIG. 8, it is possible to switch high pass filters HPF1 and HPF2 for extracting contrast value, and respective threshold values are set in accordance with the respective high pass filters HPF1 and HPF2. Also a threshold value corresponding to a contrast value (contrast threshold C-Th) and a time threshold (T-Th) corresponding to this contrast threshold are set not only for image signals from the small area 25 but also for image signals from the large area 27.

In the table shown in FIG. 8, the first row shows area subdivisions. Subdivision is carried out for either image signals from the small area 25 or image signals from the large area 27.

The second row in the table of FIG. 8 shows high pass filter subdivision. With this embodiment, two high pass filters, high pass filter HPF1 and high pass filter HPF2, are switched. High pass filters HPF1 and HPF2 are arranged inside the body control circuit 205, and carry out filter processing for image signals output from the image sensor IF circuit 203. Here, high pass filter HPF2 has a higher cutoff frequency than high pass filter HPF1. Specifically, output of high pass filter HPF2 has more high frequency components, and output of high pass filter HPF1 has lower frequency components than output of high pass filter HPF2. Here, an example using high pass filters has been described, but is also possible to use other filters for extracting specified high-frequency components, such as band pass filters.

The third row of the table in FIG. 8 shows threshold value subdivision. In the drawing, "small 1-1" represents threshold value 1 for a contrast value that is a signal that has been derived by subjecting image signals from the small area 25 to high pass filter processing by the high pass filter HPF1, and corresponds to the contrast threshold C-Th1 and the time threshold T-Th1 of FIG. 5 and FIG. 7. Also, "small 1-2" represents threshold value 2 for a contrast value that is a signal that has been derived by subjecting image signals from the small area 25 to high pass filter processing by the high pass filter HPF1, and corresponds to the contrast threshold C-Th2 and the time threshold T-Th2 of FIG. 5 and FIG. 7.

Similarly, "small 2-1" represents threshold value 1 for a contrast value that is a signal that has been derived by subjecting image signals from the small area 25 to high pass filter processing by the high pass filter HPF2, and "small 2-2" represents threshold value 2 for a contrast value that is a signal that has been derived by subjecting image signals from the small area 25 to high pass filter processing by the high pass filter HPF2. "large 1-1", "large 1-2", "large 2-1", and "large 2-2" represent threshold values 1 and 2 for contrast values that are signals derived by subjecting image signals from the large area 27 to high pass filter processing by the high pass filters HPF1 and HPF2. Examples corresponding to these threshold values have been omitted form FIG. 5 and FIG. 7.

The fourth row of the table in FIG. 8 shows determination result at the time of change detection. Specifically, A means determination that change has been detected, but that determination itself is undefined. B means defined change detection, specifically, that determination that there has been change is confirmed. The fifth row of the table represents determination result when change is not detected, and C means determining that change has not been detected.

For example, in FIG. 7, at time t2 a contrast value of image signals from the small area 25 become smaller than the contrast threshold C-Th2, and further if time t4 is reached a time for which the contrast value is smaller than the contrast threshold C-Th2 exceeds the threshold time T-Th2. If this change is detected, defined change detection B is determined. FIG. 7 shows a case where HPF1 is adopted. With the above determination, in FIG. 8, in a case where area is small area, HPF is HPF1, and threshold value is small 1-2, a determination result becomes at the time of change detection: B. In an initial stage, a change detection result is initially set to undetected C, and in the above-described case the change detection result has changed from undetected C to defined change detected B.

Also, in the above, after the contrast value has become smaller than the contrast threshold C-Th2, in the case where the contrast value has become larger than contrast threshold C-Th2 before time t4 elapses the change detection result is determined to be undetected C. In the initial state, the change detection result is initially set to undetected C, and so in the above case undetected C continues.

Also, if at time t1 a contrast value of image signals from the small area 25 becomes smaller than the contrast threshold C-Th1, and further if time t3 is reached, a time for which the contrast value is smaller than the contrast threshold C-Th1 exceeds the threshold time T-Th1. If this change is detected, change detection A is determined. With the above determination, in FIG. 8, in a case where area is small area, HPF is HPF1, and threshold value is small 1-1, a determination result is for at the time of change detection: A. Also, in the above, after the contrast value has become smaller than the contrast threshold C-Th1, in the case where the contrast value has become larger than contrast threshold C-Th1 before time t3 elapses the change detection result is determined to be undetected C.

Respective states of the small area 25 and the large area 27 are determined based on FIG. 8, and change detection is defined based on combinations of the respective states. Specifically, in defining of change detection there are a case (1) where a state of the small area 25 is change detected (A for the small area in row 4 of the table) and a state of the large area 27 is change detected (A for the large area in row 4 of the table), or a case (2) where state of the small area is defined change detected (B in row 4 of the table).

In this way, with change detection of this embodiment, if contrast value of the small area falls by a specified amount or more during a specified time, it is determined to be change detection A or defined change detection B. Then, in the case where defined change detection B has been detected, then only then is there is a transition from the change detection phase to the Wob phase or the search phase. Also, for the two areas, namely the small area and the large area, in the case where the change detection A has been detected also, there is a transition from the change detection phase to the Wob phase or the search phase.

With this embodiment, change of a subject image is determined based on contrast change amount (specifically, whether or not contrast threshold C-Th has been exceeded) and temporal change in contrast change amount (whether or not threshold time T-Th has been exceeded since C-Th was exceeded). Therefore, as shown in FIG. 6, even if the subject is moving in a depth direction (a direction such that distance from the camera changes), it is possible to carry out stable focus adjustment with high precision.

In the change detection determination table shown in FIG. 8, an example of two AF areas, a small area and a large area, has been shown, but it is also possible to divide into three areas or more. Also, an example where two high pass filters, HPF1 and HPF 2, have been provided has been described, but it also possible to provide a single high pass filter, or to provide three or more high pass filters. Also, an example where two threshold values, threshold value 1 and threshold value 2, have been provided has been shown, but it is also possible to provide three or more threshold values Next, operation of change detection (operation of the change detection phase 15) of this embodiment will be described using the flowcharts shown in FIG. 9 to FIG. 11. This flowchart is executed by the body control circuit 205 in accordance with programs stored in the memory 211, to control each section within the camera body 200 and the interchangeable lens 100. In these flowcharts, in order to simplify the description an example where a single high pass filter, either HPF1 or HPF 2, is provided will be described.

If the flow for change detection shown in FIG. 9 is entered, first of all small area change detection is carried out (S1). Here, either change detection S41 (corresponding to "A" in FIG. 8), defined change detection S43 (corresponding to "B" in FIG. 8) or change undetected S45 (corresponding to "C" in FIG. 8) is detected using image signals corresponding to the small area 25, among image signals from the image sensor 201. Detailed operation of this small area change detection will be described later using FIG. 11.

Once small area change detection has been carried out, it is determined whether or not change has been detected in the small area. Here, determination is based on the detection result for small area change detection in step S1. Specifically, in the case where detection result is change detection S41 or defined change detection S43, there has been detection and Yes is determined, and if the detection result is change undetected S45 there is no detection and determination is No.

If the result of determination in step S3 is that there has been no change detection (No), change detection processing continues. In this case the change detection phase 15 of FIG. 2 is maintained and change detection continues.

On the other hand, if the result of determination in step S3 is that there is change detection (Yes), it is next determined whether or not it is defined change detection. Here, determination is based on the result of small area change detection in step S1. If the result of this determination is defined change detection, change determination is completed. Specifically, since there has been change in the subject, there is a transition from the change detection phase 15 to the Wob phase 13 or the search phase 11 (refer to FIG. 2).

If the result of determination in step S5 is not defined change detection, next large area change detection is carried out (S7). Here, whether it is change detection S41 or change undetected S45 is detected using image signals corresponding to the large area 27, among image signals from the image sensor 201. Detailed operation of this large area change detection will be described later using FIG. 10.

Once large area change detection has been carried out, it is determined whether or not change has been detected in the large area. Here, determination is based on the detection result for large area change detection in step S7. If this result of determination is change undetected S45 in the large area, change detection processing continues. In this case the change detection phase 15 of FIG. 2 is maintained and change detection continues.

Figure 2:
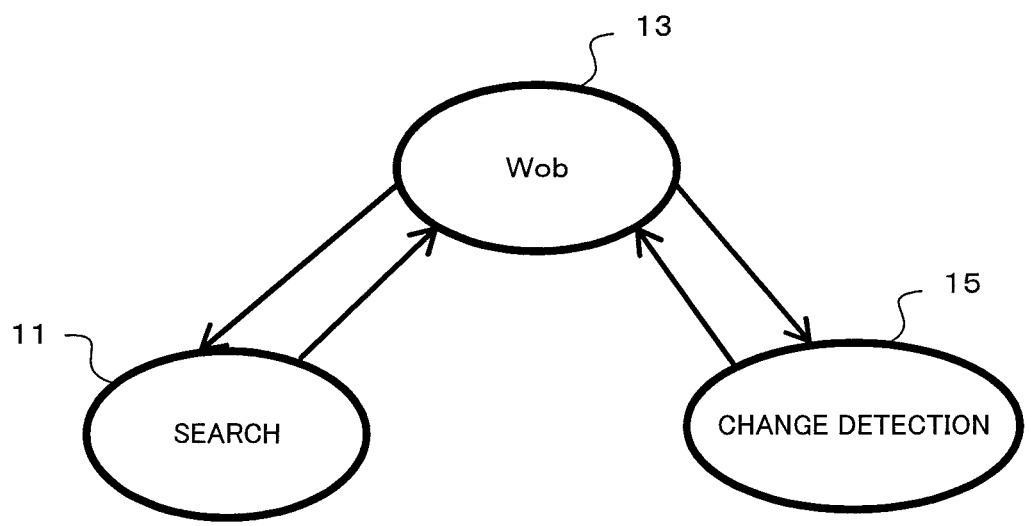
FIG. 2 is a state transition diagram at the time of movie AF, with the camera of one embodiment of the present invention.

On the other hand, if the result of determination in step S9 is change detection S41 in the large area, since there was change in both the small area and the large area, change detection is completed, and there is a transition from the change detection phase 15 to the Wob phase 13 or the search phase 11 (52 FIG. 2).

In this way, in the flow for change detection processing, in response to change detection for the small area and the large area change detection processing continues, or change detection is completed and there is a transition to the Wob phase 13 or the search phase 11. In the case where a plurality of HPFs are provided, there are small area change detection processes respectively corresponding to the plurality of HPFs, and if change detection has been determined for any one process it is also determined there has been change detection in step S3. Also, if change detection has been determined for all or some of the plurality of HPFs, it is also determined in step S3 that there has been change detection. The same also applies to the large area change detection processing.

Next, detailed operation of the large area change detection in step S7 will be described using the flowchart shown in FIG. 10. If the flow for large area change detection is entered, it is first determined whether or not a contrast value change is larger than the contrast change amount threshold value of threshold value 1 (S21). Here, it is determined whether or not a contrast value based on image signals from the large area 27 has become smaller than, for example, a contrast threshold value C-T1$b$ (suffixed b representing correspondence to the large area) appropriate to threshold value 1.

If the result of determination in step S21 is that the contrast value change is larger than the contrast value change amount threshold value of threshold value 1 (C-Th1$b$), a threshold value 1 continuation time counter is updated (S23). Here, a timer operation is carried out for determining whether or not a time from when the contrast value became smaller than the contrast threshold C-Th1$b$ has exceeded a threshold time T-Th1$b$ responding to threshold values 1. The threshold value 1 continuation time counter is updated every time image signals for one frame are output from the image sensor 201.

Once the threshold value 1 continuation time counter has been updated, it is next determined whether or not the threshold value 1 continuation time counter has reached a threshold value 1 continuation time threshold value T-Th1$b$ (S25). Here, determination as to whether or not a time, from when the contrast value became smaller than the contrast threshold C-Th1$b$ corresponding to threshold value 1, has exceeded the threshold time T-Th1$b$ corresponding to threshold values 1 is based on a counter value of the threshold value 1 continuation time counter of step S23.

If the result of determination in step S25 is that the threshold value 1 continuation time counter has not reached the threshold value 1 continuation time threshold value T-Th1$b$, it is next determined whether or not the contrast value change is larger than contrast change amount threshold for threshold value 2 (S27). Here, for example, it is determined whether or not a contrast value based on image signals from the large area 27 has become smaller than a contrast threshold value C-Th2$b$ corresponding to threshold value 2.

If the result of determination in step S27 is that the contrast value change is larger than the contrast change amount threshold for threshold value 2, next a threshold value 2 continuation time counter is updated (S29). Here, a timer operation for determining whether or not a time, from when the contrast value became smaller than the contrast threshold C-Th2$b$ corresponding to threshold value 2, has exceeded a threshold time T-Th2$b$ corresponding to threshold value 2, is carried out. The threshold value 2 continuation time counter is updated every time image signals for one frame are output from the image sensor 201.

Once the threshold value 2 continuation time counter has been updated, it is next determined whether or not the threshold value 2 continuation time counter has reached the threshold value 2 continuation time threshold value T-Th2*b* (S31). Here, it is determined whether or not a time, from when the contrast value became smaller than the contrast threshold C-Th2*b* corresponding to threshold value 2, has exceeded a threshold time T-Th2*b* corresponding to threshold value 2, based on the counter value of the threshold value 2 continuation time counter in step S29.

If the result of determination in step S25 is that the threshold value 1 continuation time counter has reached the threshold value 1 continuation time threshold value T-Th1*b*, or if the threshold value 2 continuation time counter has reached the threshold value 2 continuous time threshold value T-Th2*b*, change detection is determined. Here, since a threshold time T-Th1*b* or T-Th2*b* corresponding to threshold value 1 or threshold value 2 has been reached since image signals from the large area became smaller than contrast threshold C-Th1*b* or C-Th2*b* corresponding to threshold value 1 or threshold value 2, there is change in the subject of the large area, and change detection S41 is determined.

Also, if the result of determination in step S21 is that change in contrast value is not larger than the contrast change amount threshold value C-Th1*b* for threshold value 1, or if the result of determination in step S27 is that the change in contrast value is not larger than the contrast change amount threshold value C-Th2*b* for threshold value 2, or if the result of determination in step S31 is that the threshold value 2 continuation time counter has not reached the threshold value 2 continuous time threshold value T-Th2*b*, there is no change in the subject of the large area and change undetected S45 is determined.

In this way, in the flow for large area change detection, afterimage signals from the large area have exceeded the contrast threshold C-Th (S21), change detection S41 is determined if the threshold time T-Th is reached (S25). On the other hand, change undetected S45 is determined until conditions are satisfied. In the case where a plurality of HPFs provided, processing of the flowchart in FIG. 10 is carried out for every type of HPF, and the determination result for change detection is obtained for every HPF.

Next, detailed operation of the small area change detection in step S1 will be described using the flowchart shown in FIG. 11. Compared to the large area change detection that was shown in FIG. 10, this small area change detection flow differs in that while with the flow for large area detection change in contrast value is detected using image signals from the large area 27 of the image sensor 201, with the small area change detection change in contrast value is detected using image signals from the small area 25 of the image sensor 201.

However, apart from the fact that the image signals used are different, and that settings in accordance with results of determination (change detection S41 etc.) are different, each of the processes in steps S21*a*-S31*a* in FIG. 11 are substantially the same as the flow shown in FIG. 10. Therefore, in the flow of FIG. 11, for steps that execute the same processing as in FIG. 10, the same step numbers will be suffixed with "a", and detailed description will be omitted. Since the settings for result of determination, change detection S41, defined change detection S43 and change undetected S45 are different, description will center on these points of difference.

With the small area change detection flow shown in FIG. 11, the fact that change detection S41 has been set is a case where the threshold value 1 continuation time counter has reached the threshold value 1 continuation time threshold T-Th1 in step S25*a*. This case is a case where the time of the threshold time T-Th1 corresponding to threshold value 1 has elapsed after the contrast value based on image signals from the small area 25 has become smaller than the contrast threshold C-Th1 corresponding to threshold value 1.

In the flow for the area change detection shown in FIG. 11, the condition that defined change detection S43 can be set is a case where the threshold value 2 continuation time counter has reached the threshold value 2 continuation time threshold T-Th2 in step S31*a*. This case is a case where the threshold time T-Th2 corresponding to threshold value 2 has elapsed after the contrast value based on image signals from the small area 25 has become smaller than the contrast threshold C-Th2 corresponding to threshold value 2.

The relationship between threshold value 1 and threshold value 2 is that, in FIG. 7, the combination of contrast threshold C-Th1 and threshold time T-Th1 corresponds to threshold value 1, and the combination of contrast threshold C-Th2 and threshold time T-Th2 corresponds to threshold value 2. Specifically, contrast threshold C-Th is a lower level for threshold value 2 compared to threshold value 1, and threshold time corresponding to a large contrast change amount is longer.

Therefore, in FIG. 11, the case where defined change detection S43 has been set is a case where contrast value becomes smaller (smaller than the contrast threshold C-Th2, namely, degree of out of focus becomes larger), and this state continues for a specified time (threshold time T-Th2) (specifically, time spent out of focus is long). On the other hand, the case where change detection S41 has been set is a case where contrast value becomes small (Smaller than contrast threshold C-Th1. However, contrast value is higher than for the case where defined change detection S43 has been set, and degree of out of focus is comparatively large.), and this state continue for a specified time (threshold time T-Th1).

In the flow for small area change detection shown in FIG. 11, the fact that change undetected S45 has been set is a case where the above described conditions have not been satisfied, and is a case where the results of determination in steps S21*a*, S27*a* and S31 are No.

In this way, in the flow for small area change detection, after image signals from the small area have exceeded the contrast threshold C-Th1 (S21*a*), change detection S41 is determined if the threshold time T-Th1 is reached (S25*a*). Also, after image signals from the small area have exceeded the contrast threshold C-Th2 (S27*a*), defined change detection 43 is determined if the threshold time T-Th2 is reached (S31*a*). On the other hand, change undetected S45 is determined until conditions of either change detection S41 or defined change detection S43 have been satisfied. In the case where a plurality of HPFs provided, processing of the flowchart in FIG. 11 is carried out for every type of HPF, and a determination result for change detection is obtained for every HPF.

As has been described above, with the one embodiment of the present invention the size of an AF area during lens drive for focus detection, such as in the search phase 11 and the Wob phase 13, is different from the size of an AF area when the lens is stopped, in the change detection phase 15 (refer to FIG. 3). It is therefore possible to improve focus adjustment precision and the stability of a focus adjustment operation.

Also, with the one embodiment of the present invention, in the change detection phase, it is determined whether or not it is necessary to recommence a focus adjustment operation due to focused state of a subject being changed based on change in contrast value based on comparison between contrast value and contrast threshold (C-Th), and continuation time for a change state. It is therefore possible to improve focus adjustment precision and the stability of a focus adjustment operation.

Also, with the one embodiment of the present invention, in the change detection phase, change detection (including defined change detection) is carried out using threshold values 1 and 2 (combinations of contrast threshold C-Th and threshold time T-Th) for change detection, with respect to the contrast value, and it is determined whether or not it is necessary to recommence a focus adjustment operation (refer to FIG. 4-FIG. 8). It is therefore possible to improve focus adjustment precision and the stability of a focus adjustment operation.

In the one embodiment of the present invention, two AF areas are provided in the change detection phase, namely the small area 25 and the large area 27, but this is not limiting. For example, it is possible to arrange an intermediate area between the small area 25 and the large area 27, to give three areas, or to have more than three areas. In this case, by changing contrast threshold and threshold time in accordance with the area size, further optimized change detection becomes possible.

Also, with the one embodiment of the present invention the AF areas have been provided substantially in the center of a shooting screen 21, but arrangement is not limited to in the center, and AF areas may also be arranged at positions offset to the top, bottom, left or right from the center. Also, the small area has been positioned substantially in the center of the large area, but the small area may also be arranged at a position that is offset from the center. In this case, it is possible to either not change the position of the large area, or to move the position of the large area in accordance with the position of the small area. Also, the small area may be placed at a position that has been set by the user using a touch panel operation or cross-shaped key operation, for example. Also, in this case, when the small area is provided at the lower left of the large area, the large area may be positioned at the lower left without changing the area size of the large area.

It is also possible to set the small area to the position of a face of a subject. At this time, in a case where the face position is outside the large area, it is possible to set the small area in a range outside the large area. In this way it is possible to prevent unnecessary change detection due to angle and lighting condition of a subject's face. It is also possible to set the small area to the position of tracked subject. At this time the small area may be set outside of the large area. In this case, it is possible to prevent unnecessary change detection arising due to slight movement of the subject etc.

Also, with the one embodiment of the present invention, the contrast threshold C-Th has been described as a threshold for a case where the contrast value is lowered, but conversely it is also possible to similarly provide a threshold value for the case where the contrast value is raised.

Also, with the one embodiment of the present invention, only two threshold values, threshold value 1 and threshold value 2, are provided, but it is also possible to have only one, or to have three or more. Also, regarding combinations of contrast threshold C-Th and threshold time corresponding to threshold value, with threshold value 1 and threshold value 2 C-Th and T-Th are respectively different, but the threshold value for C-Th or T-Th may be the same.

Also, with the one embodiment of the present invention, focus adjustment operation at the time of movie shooting has been described, but this is not limiting and may also be applied to at the time of live view display.

Further, with this embodiment, a device for taking pictures has been described using a digital camera, but as a camera it is also possible to use a digital single lens reflex camera or a compact digital camera, or a camera for movie use such as a video camera, and further to have a camera that is incorporated into a mobile phone, a smart phone, a mobile information terminal (PDA: Personal Digital Assistant), tablet type computer, game console etc. In any event, it is possible to adopt the present invention as long as a device carries out focus adjustment using contrast.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A focus adjustment device, having an image sensor for forming a subject image using light flux that has been received through a photographing lens and generating image signals, executes focus adjustment based on the image signals, and comprises:
   a focus detection region setting section for setting a plurality of focus detection regions of differing sizes, within a region in which an image is formed by the image sensor;
   a determination section, for detecting contrast of image signals within focus detection regions respectively relating to the plurality of focus detection regions, and determining change of a subject based on amount of change of the contrast and temporal change in amount of change of the contrast; and
   a control section for, in a case where the determination section has determined that there is subject change when a focus adjustment operation is stopped, starting the focus adjustment operation,
   wherein the determination section measures a first time, being a state where the change amount of the contrast value exceeds a first determination value, and determines change of a subject image when the first time exceeds a second determination value, and
   wherein the determination section sets second determination values that are different to respectively different first determination regions, for a plurality of focus detection regions of differing size.

2. The focus adjustment unit of claim 1, wherein the determination section measures a second time for a state in which a change amount for contrast, in a smaller focus detection region, among the plurality of focus detection regions of differing sizes, exceeds a third determination value that is smaller than the first determination value, and in the event that the second time exceeds a fourth determination value that is smaller than the second determination value, measures a third time for a state in which change amount for contrast in a larger focus detection region exceeds a fifth determination value corresponding to the different first determination value, the third time exceeds a sixth determination value corresponding to the different second determination value, determines that there is change of the subject image.

3. The focus adjustment unit of claim 1, wherein the determination section measures a second time for a state in which a change amount for contrast, in a smaller focus detection region, among the plurality of focus detection regions of differing sizes, exceeds a third determination value that is smaller than the first determination value, and if the second time exceeds a fourth determination value that is smaller than the second determination value, measures a third time for a state in which change amount for contrast in a larger focus detection region exceeds a fifth determination value corresponding to the different first determination value, and in the event that the third time does not exceed a sixth determination value corresponding to the different second determination value, determines that there is no change of the subject image.

4. The focus adjustment unit of claim 1, wherein the determination section measures a second time for a state in which a change amount for contrast, in a smaller focus detection region, among the plurality of focus detection regions of differing sizes, exceeds a third determination value that is smaller than the first determination value, and if the second time exceeds a fourth determination value that is smaller than the second determination value, measures a third time for a state in which change amount for contrast in a larger focus detection region exceeds a third determination value, the third time exceeds the fourth determination value, determines that there is change of the subject image.

5. The focus adjustment unit of claim 1, wherein the determination section measures a second time for a state in which a change amount for contrast, in a smaller focus detection region, among the plurality of focus detection regions of differing sizes, exceeds a third determination value that is smaller than the first determination value, and if the second time exceeds a fourth determination value that is smaller than the second determination value, measures a third time for a state in which change amount for contrast in a larger focus detection region exceeds a third determination value, and in the event that the third time exceeds the fourth determination value, determines that there is no change of the subject image.

6. The focus adjustment unit of claim 1, wherein the control section carries out a focus adjustment operation by switching between first operating state where a focus adjustment operation is carried out, and a second state there a focus adjustment operation is stopped and change of a subject image is detected, and
    the focus detection region setting section makes arrangement of the focus detection regions different in the first operating state and in the second operating state.

7. A control method for a focus adjustment device, that has an image sensor for forming a subject image using light flux that has been received through a photographing lens, and generating image signals, and executes focus adjustment based on the image signals, comprising:

setting a plurality of focus detection regions of differing sizes within a region in which an image is formed by the image sensor;

detecting contrast of image signals within focus detection regions respectively relating to the plurality of focus detection regions, and determining change of a subject based on amount of change of the contrast and temporal change in amount of change of the contrast;

in a case where change of a subject has been determined when a focus adjustment operation is stopped, starting a focus adjustment operation;

measuring a first time, being a state where the change amount of the contrast value exceeds a first determination value, and determines change of a subject image when the first time exceeds a second determination value; and setting second determination values that are different to respectively different first determination values, for a plurality of focus detection regions of differing size.

8. The control method of claim 7, further comprising:
measuring a second time for a state in which a change amount for contrast, in a smaller focus detection region, among the plurality of focus detection regions of differing sizes, exceeds a third determination value that is smaller than the first determination value, and in the event that the second time exceeds a fourth determination value that is smaller than the second determination value, measuring a third time for a state in which the change amount for contrast in a larger focus detection region exceeds a fifth determination value that is the different first determination value, and the third time exceeds a sixth determination value that is the different second determination value, determining that there is change of the subject image.

9. The control method of claim 7, further comprising:
measuring a second time for a state in which a change amount for contrast, in a smaller focus detection region, among the plurality of focus detection regions of differing sizes, exceeds a third determination value that is smaller than the first determination value, and even if the second time exceeds a fourth determination value that is smaller than the second determination value,
measuring a third time for a state in which the change amount for contrast in a larger focus detection region exceeds a fifth determination value that is the different first determination value, and in the event that the third time exceeds a sixth determination value that is the different second determination value, determining that there is no change of the subject image.

10. The control method of claim 7, further comprising:
measuring a second time for a state in which a change amount for contrast, in a smaller focus detection region, among the plurality of focus detection regions of differing sizes, exceeds a third determination value that is smaller than the first determination value, and if the second time exceeds a fourth determination value that is smaller than the second determination value, measuring a third time for a state in which change amount for contrast in a larger focus detection region exceeds a third determination value, the third time exceeds the fourth determination value, determining that there is change of the subject image.

11. The control method of claim 7, further comprising:
measuring a second time for a state in which the change amount for contrast, in a smaller focus detection region, among the plurality of focus detection regions of differing sizes, exceeds a third determination value that is smaller than the first determination value, and if the second time exceeds a fourth determination value that is smaller than the second determination value, measuring a third time for a state in which the change amount for contrast in a larger focus detection region exceeds a third determination value, and in the event that the third time does not exceed the fourth determination value, determining that there is no change of the subject image.

12. A control method for a focus adjustment device, that has an image sensor for forming a subject image using light flux that has been received through a photographing lens, and generating image signals, and executes focus adjustment based on the image signals, comprising:

setting a plurality of focus detection regions of differing sizes within a region in which an image is formed by the image sensor;

detecting contrast of image signals within focus detection regions respectively relating to the plurality of focus detection regions, and determining change of a subject based on amount of change of the contrast and temporal change in amount of change of the contrast;

in a case where change of a subject has been determined when a focus adjustment operation is stopped, starting a focus adjustment operation;

carrying out a focus adjustment operation by switching between a first operating state where a focus adjustment operation is carried out, and a second state there a focus adjustment operation is stopped and change of a subject image is detected; and making arrangement of the focus detection regions different in the first operating state and in the second operating state.

* * * * *